(12) United States Patent
Chowdhury et al.

(10) Patent No.: US 12,610,327 B2
(45) Date of Patent: Apr. 21, 2026

(54) MULTI-RANGE POWER DETECTION

(71) Applicant: Avago Technologies International Sales Pte. Limited, Singapore (SG)

(72) Inventors: Debopriyo Chowdhury, San Diego, CA (US); Mahnaz Atri, San Diego, CA (US); Ali Afsahi, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 370 days.

(21) Appl. No.: 18/498,781

(22) Filed: Oct. 31, 2023

(65) Prior Publication Data

US 2025/0142491 A1 May 1, 2025

(51) Int. Cl.
*H04W 52/04* (2009.01)
*H04B 17/318* (2015.01)
*H04W 52/36* (2009.01)

(52) U.S. Cl.
CPC ........ *H04W 52/367* (2013.01); *H04B 17/318* (2015.01)

(58) Field of Classification Search
CPC ... H04W 52/367; H04W 52/52; H04W 52/04; H04W 52/08; H04W 52/18; H04W 52/248; H04B 17/318; H04B 17/13; H04B 7/18543; H03F 3/19; H03F 3/213; H03F 3/245
See application file for complete search history.

(56) References Cited

U.S. PATENT DOCUMENTS

| | | | |
|---|---|---|---|
| 8,208,863 B2 | 6/2012 | Behzad | |
| 8,829,997 B1 * | 9/2014 | Morkner | H03G 3/3042 |
| | | | 330/285 |
| 10,659,142 B1 * | 5/2020 | Nordgran | H04W 16/26 |
| 12,245,163 B1 * | 3/2025 | Elsayed | H04W 52/383 |
| 2004/0110475 A1 * | 6/2004 | Korol | H04W 52/52 |
| | | | 455/574 |
| 2005/0227641 A1 * | 10/2005 | Schmitz | H04B 1/04 |
| | | | 455/127.1 |

(Continued)

OTHER PUBLICATIONS

Foreign Action other than Search Report on non-Foley case related to US Dtd Mar. 19, 2025.

(Continued)

*Primary Examiner* — Andrew Wendell
(74) *Attorney, Agent, or Firm* — Foley & Lardner LLP

(57) ABSTRACT

A device comprising a first circuit, a second circuit, and a third circuit. The first circuit to receive, from an amplifier, a first signal having a first amount of power. The first circuit to also determine, based on the first amount of power, a range of power associated with transmission of the first signal by a transmitter. The second circuit to receive a second signal to define one or more characteristics of the second circuit. Receipt of the second signal, by the second circuit, can cause the second circuit to adjust the first signal from the first amount of power to a second amount of power. The third circuit to receive, from the second circuit, the first signal having the second amount of power, and the third circuit to provide a third signal having a voltage level to indicate a third amount of power transmitted by the transmitter.

20 Claims, 5 Drawing Sheets

(56)  References Cited

U.S. PATENT DOCUMENTS

| | | | |
|---|---|---|---|
| 2011/0293033 A1* | 12/2011 | Kushnir | H04L 27/2614 |
| | | | 375/295 |
| 2014/0312974 A1* | 10/2014 | Khesbak | H03F 3/21 |
| | | | 330/279 |
| 2016/0072457 A1* | 3/2016 | Subrahmaniyan Radhakrishnan | H03F 1/0227 |
| | | | 375/219 |
| 2020/0235671 A1* | 7/2020 | Radic | H02M 1/0022 |
| 2021/0036724 A1* | 2/2021 | Lam | H03G 3/3042 |
| 2021/0099137 A1* | 4/2021 | Drogi | H03F 1/0227 |
| 2022/0248365 A1* | 8/2022 | Zhang | H04L 5/0053 |
| 2022/0393647 A1* | 12/2022 | Chou | H03F 1/0222 |
| 2023/0421271 A1* | 12/2023 | Huang | H04B 17/13 |

OTHER PUBLICATIONS

Shih, H., et al. "A highly-integrated 3-8 GHz ultra-wideband RF transmitter with digital-assisted carrier leakage calibration and automatic transmit power control." IEEE transactions on very large scale integration (VLSI) systems 20.8 (2011): 1357-1367.

* cited by examiner

135

500

505

Receive a first signal having a first amount of power

510

Determine a range of power associated with a transmitter

515

Receive a second signal to adjust the first signal

520

Receive the first signal having a second amount of power

525

Provide a third signal to indicate a third amount of power

MULTI-RANGE POWER DETECTION

BACKGROUND

The present disclosure is related to transmission of signals and variable range power detection.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
FIG. 1 is a block diagram of a system for use in signal transmission and power detection, according to some embodiments.
Figure 1:
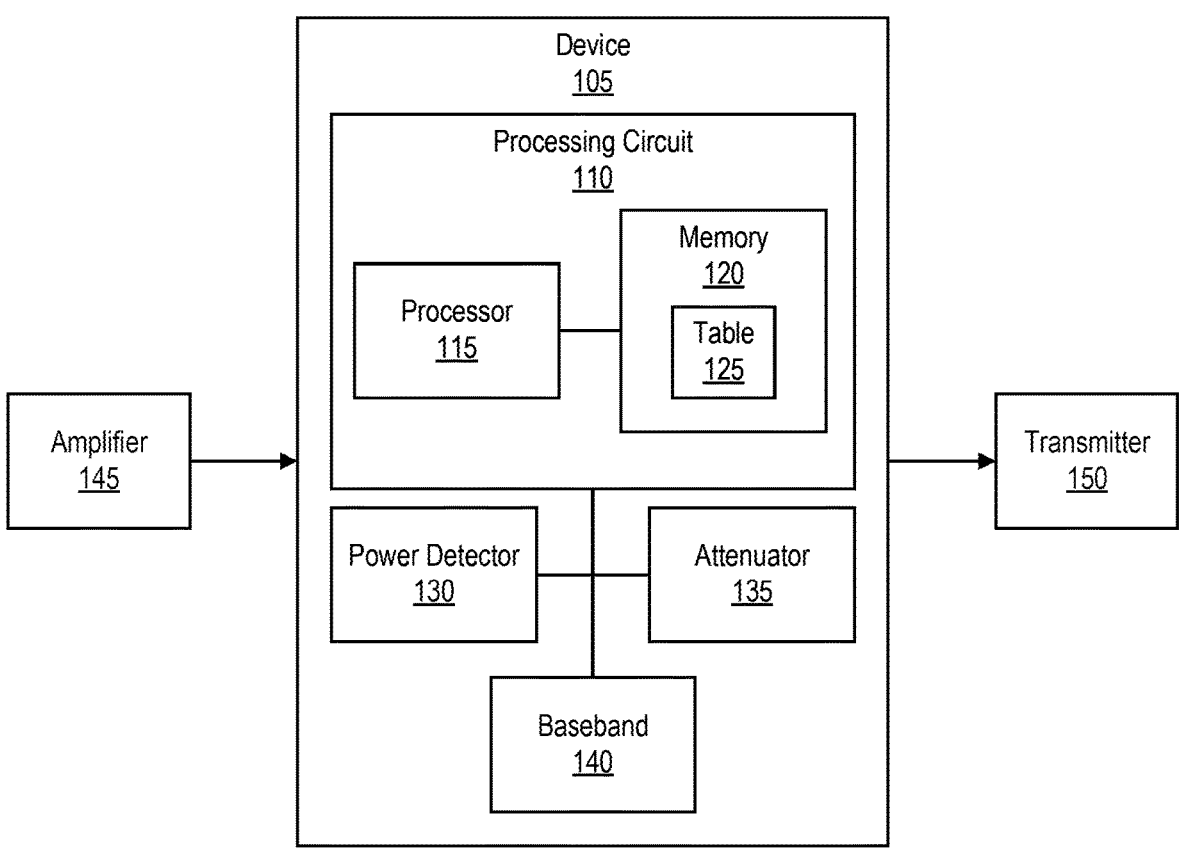

Some embodiments are related to systems and methods for power detection and signal transmission control. Power detection may include detecting and/or determining signal strength for communications in a communication system. For example, power detection may include determining a decibel level of a signal that is transmitted by an antenna. Power detection may be used in closed loop power control. For example, power detection may be used to determine when to adjust and/or modify amounts of power (e.g., decibel levels) of signals transmitted by an antenna. Signal transmission may include one or more communication standards and/or protocols. For example, communication systems may communicate via Wide-Area Networks (WANs) and Bluetooth. Communication standards may include dynamic power ranges (e.g., decibel levels that are encompassed within a given communication standard). For example, WAN standards may include a decibel range of 30 dB (e.g., decibels). To continue this example, a power detector that can detect power levels within the dynamic range for WAN transmissions may be implemented and/or utilized to provide consistent and/or accurate power detection. In some embodiments, the accuracy of power detection, within a given dynamic range, may be impacted by a power detectors ability to detect power levels across the given dynamic range.

Communication standards that have a wide operating dynamic range can provide several challenges. For example, signals that are transmitted on the higher end of the dynamic range may become saturated. As another example, signals that are transmitted on the lower end of the dynamic range may be undetected and/or impacted by noise. Signals that are transmitted on the higher end may become saturated when a power detector detects signals as having similar power levels even when the power levels are different. For example, a first signal may have a first power level and a second signal may have a second power level. To continue this example, the first power level and the second power level may be on the higher end of a dynamic range. Furthermore, a power detector may detect the first power level as being the same as the second power level.

Other communication systems may implement and/or utilize multiple power control circuitries to provide power detection for multiple communication standards. For example, other communication systems may include a first power control circuitry for Bluetooth transmission and a second power control circuitry for WAN transmission. The inclusion of multiple power control circuitry can impact chip size. For example, other communication systems may be included in and/or implemented as a System On Chip (SoC). To continue this example, SoCs that have two or more power control circuitries may increase the overall size of the SoC's. Power control circuitries may include and/or communicate with attenuators. For example, power detectors may be designed to determine that a given voltage level and/or current level corresponds to a given power level of a transmitted signal. To continue this example, the power detector may not be provided the actual power level of the transmitted signal but instead is provided, by the attenuator, an attenuated signal. The power detector may be unable to handle the actual power level of the transmitted signal. However, the utilization of attenuators, in the other communication systems may further cause issues with signal saturation and/or noise interference.

Some technical solutions and advantages of some embodiments are related to a system including a device that may implement programable power detection to provide power detection across dynamic ranges for multiple communication standards. For example, the device may provide power detection for a dynamic range regarding Wireless Local Area Network (WLAN) standards and power detection for a dynamic range regarding Bluetooth standards. The device may implement and/or include programable and/or modular power detectors to detect power levels across one or more portions of a dynamic range. The device may capture and/or cover the entire dynamic range by creating a table or graph that includes correlations between power levels and signal indicators. For example, the device may create a table that includes one or more regions that relate power levels to one or more Transmitted Signal Strength Indicators (TSSIs).

The device may also share and/or allocate one or more components for use in multiple communications standards. For example, the device may share a baseband for use in WLAN and Bluetooth signal transmissions. The allocation of the one or more components may reduce and/or eliminate components from the device. The device may allocate the one or more components with communication standards that do not involve transmitting signals at the same time. For example, WLAN signals and Bluetooth signals are not transmitted at the same time. To continue this example, the device may allocate a single power detector baseband to use in WLAN signal power detection and in Bluetooth signal power detection.

The power detectors may include and/or communicate with adjustable attenuators. For example, the adjustable attenuators may be able to attenuate signals by one or more levels and/or percentages. As another example, the adjustable attenuators may be able to attenuate signals by 50%, 60%, 75%, etc. In some embodiments, an adjustable attenuator that attenuates a signal by 60% may attenuate a signal from 10 Volts to 4 Volts (e.g., 60% of the original signal was attenuated). The adjustable attenuators may provide assist with the power detectors being able to detect power levels across a dynamic range.

As a non-limiting example, the table may include a first region and a second region. The first region may encompass and/or include one or more first power levels for a given dynamic range. To continue this non-limiting example, the first region may include power levels from negative 15 dBm (e.g., −15 dBm) and 5 dBm. The second region may encompass and/or include one or more second power levels for the given dynamic range. To continue this non-limiting example, the first region may include power levels from 5 dB to 25 dB. In this non-limiting example, the dynamic power range may be 40 dB (e.g., 25 dB–(−15 dB)). To continue this non-limiting example, the device may determine when to utilize the first region and/or the second region. In this non-limiting example, the device may utilize the first region when a first given attenuation setting is utilized and the device may utilize the second region when a second given attenuation setting is utilized. To continue this non-limiting example, the device may receive signals from a System on Chip (SoC), based on a predetermined output power, to determine an attenuation setting. The power detector may control, adjust, modify, and/or reconfigure itself and/or the attenuator, based on SoC programming, to detect power within the selected region. In this non-limiting example, the device may receive signals from a first power amplifier regarding signals that are associated with WLAN standards and the device may receive signals from a second power amplifier regarding signals that are associated with Bluetooth standards. In this non-limiting example, the signals received by the power amplifiers may include and/or specify a power level associated with a given transmission. The device may determine, based on the indicated power level, a given region.

In some embodiments, the device may include at least one circuit. For example, the device may include a first circuit, a second circuit, and a third circuit. In some embodiments, the device may be in communication with a driver (e.g., a remote and/or external amplifier). The communication between the device and the driver can be direct (e.g., the device is directly connected to the driver and the device directly communicates with the driver) and/or indirect (e.g., a component receives signals from the driver and the component provides the signals to the device) in some embodiments. The communication between the device and the driver can include the device and driver being electrically coupled with one another.

A system may refer to and/or include at least one of Application-Specific Integrated Circuits (ASIC), capacitive load components, display drivers, touch screens, keyboard sensors, mobile devices, and/or among other possible touch controllers. A device may refer to and/or include at least one an integrated circuit, a general purpose processor, a multi-core processor, a software programmable device, a programmable logic controller, and/or among other possible circuitry and/or hardware, in some embodiments. Similarly, the functionality of the device may be stored, in memory, as software and/or as instructions and when the information (e.g., the software and/or instructions) stored in memory are executed, by a processor, results in the processor performing the functionality of the device (e.g., the processor can detect signal transmissions and/or amounts of power associated with the signal transmissions) and/or performing the functionality of a component of the device (e.g., the first circuit, the second circuit, and/or the third circuit).

A circuit may refer to and/or include at least one of an operational amplifier (Opamp), a comparator circuit, filters, a digital signal processing engine, a pattern generator (e.g., a device that sends control signals to components of the device and/or the system), Flip Flops, logic gates, latches, state storage, a power detector, a baseband device, a baseband processor, an integrated circuit, a software programmable device, a programmable logic controller, a communication device, and/or among other possible circuitry and/or hardware, in some embodiments.

An amplifier may refer to and/or include at least one of a driver circuit, an integrated circuit, an Opamp, a regulator, a software programmable device, a programmable logic controller, and/or among other possible circuitry and/or hardware, in some embodiments. A level may refer to and/or include at least one of a voltage level of a signal, an amount of voltage of a signal, an amount of power of a signal, an amount of current of a signal, and/or various combinations, in some embodiments. Power levels may refer to and/or include at least one of an amount of power, a voltage level, an amount of voltage, a current level, an amount of current, a signal strength, a decibel value, a decibel range, a noise metric, and/or various possible combinations and/or alternatives. Power detection may refer to and/or include at least one of steps, processes, actions, and/or routines that are implemented to detect power levels. A range of power may refer to and/or include one or more power levels, multiple power levels, a collection of power levels, and/or a combination of power levels.

A difference may refer to and/or include an indication of which signal (e.g., a first signal or a second signal) is larger and/or smaller from each other, a binary value (e.g., a zero or a one) to indicate whether a first signal is higher and/or lower than a second signal, and/or among various combinations, in some embodiments. A difference may also refer to a mathematical difference between two or more signals (e.g., a larger signal minus a smaller signal), a mathematical difference between two or more values and/or levels, and/or various combinations, in some embodiments. An offset may refer to and/or include at least one of a phase shift of a signal, a time shift of a signal, a delay of a signal, a modification of a time constant, and/or various combinations, in some embodiments.

A component may refer to and/or include at least one of a voltage source (e.g., batteries, current through resistors, etc.), circuitry hardware (e.g., transistors, resistors, capacitors, inductors, diodes, etc.), and/or among various combinations, in some embodiments. An amount of resistance experienced by a circuit may refer to and/or include at least one of a load applied to a signal, an amount of electrical resistance, an amount of impedance, an amount of inductance, an amount of capacitance, and/or various combinations, in some embodiments.

A transmitter may refer to and/or include at least one of a transceiver, a receiver, an antenna, a communication device, and/or other possible means for transmitting signals. Characteristics of a circuit may refer to and/or include at least one of setpoints, configuration settings, state adjustments, control actions, parameters, and/or possible equipment control metrics. Adjusting and/or an adjust to a signal may refer to and/or include changing, modifying, altering, replacing, and/or otherwise switching from a first power level to a second power level. A voltage level to indicate an amount of power may refer to and/or include correlations between voltage levels and amounts of power, ratios between voltage levels and amounts of power, relationships between voltage levels and amounts of power, and/or various combinations.

A table may refer to and/or include at least one of a data structure, a date store, a database, a collection of information, a graph, an array, and/or other possible information. Controlling a transmitter may refer to and/or include providing signals that cause the transmitter to adjust one or more aspects of a transmitted signal. A point in time may refer to and/or include a given point within at least one of a second, a minute, an hour, a day, a week, a month, a year, and/or otherwise possible points in time. A difference between points in time may refer to and/or include a first point in time occurring prior to a second point in time, a second point in time occurring subsequent to a first point in time, a first point in time occurring prior to and/or after a second point in time, and/or various combinations. A communication standard may refer to and/or include at least one of protocols, communication protocols, means for communicating, wired communication, wireless communication, regulations, and/or various combinations.

At least one embodiment relates to a system. The system can include a transmitter and a device. The device can be in communication with the transmitter. The device can include a first circuit. The first circuit can receive, from an amplifier, a first signal having a first amount of power. The first circuit can also determine, based on the first amount of power, a range of power associated with transmission of the first signal by the transmitter. The device can also include a second circuit. The second circuit can receive, from the first circuit, a second signal to define one or more characteristics of the second circuit. Receipt of the second signal, by the second circuit, can cause the second circuit to adjust the first signal from the first amount of power to a second amount of power. The device can also include a third circuit. The third circuit can receive, from the second circuit, the first signal having the second amount of power. The third circuit can also provide a third signal having a voltage level to indicate a third amount of power transmitted by the transmitter.

In some embodiments, the third amount of power can be the same as the first amount of power. The third signal can be provided to the first circuit. The first circuit can receive, from the third circuit, the third signal. The first circuit can also determine, responsive to receipt of the third signal, that the third signal has a second voltage level to indicate a fourth amount of power transmitted by the transmitter. The first circuit can also retrieve, from memory of the device, a table that includes correlations between a plurality of voltage levels of the third signal and a plurality of amounts of power that the transmitter is configured to transmit. The first circuit can also determine, based on the table, that the voltage level is correlated to the third amount of power. The first circuit can also control, responsive to the third signal having the second voltage level, the transmitter to cause the transmitter to adjust the first signal from the fourth amount of power to the first amount of power.

In some embodiments, the transmitter can transmit the first signal responsive to receipt of the first signal by the first circuit. The second amount of power can be different than the first amount of power, and the second circuit can adjust a plurality of signals by a predetermined amount.

In some embodiments, the first circuit can also receive, from the amplifier, a fourth signal having a fourth amount of power. The first circuit can also determine, based on the fourth amount of power, a second power range associated with transmission of the fourth signal by a second transmitter. The first circuit can also control the second circuit to adjust the fourth signal from the fourth amount of power to a fifth amount of power.

In some embodiments, the first circuit can also receive, at a first point in time, the third signal. The first circuit can also receive, at a second point in time, a fifth signal having a second voltage level to indicate a sixth amount of power transmitted by the second transmitter. The first point in time can be different than the second point in time.

In some embodiments, the first circuit can also retrieve, responsive to receipt of the third signal, a first table stored in memory of the device. The first circuit can also determine, based on the first table, that the third amount of power is the same as the first amount of power. The first circuit can also retrieve, responsive to receipt of the fifth signal, a second table stored in memory of the device. The first circuit can also determine, based on the second table, that the sixth amount of power is the same as the fourth amount of power.

In some embodiments, the transmitter can transmit the first signal according to a first protocol. A second transmitter can transmit a fourth signal according to a second protocol. The first circuit can control transmission of the first signal by the transmitter and control transmission of the fourth signal by the second transmitter based on communication with the third circuit.

In some embodiments, the communication with the third circuit can include determining, by the first circuit, that the third amount of power is different from the first amount of power. The communication with the third circuit can also include controlling, by the first circuit, based on the difference between the third amount of power and the first amount of power, the transmitter to adjust transmission of the first signal by the transmitter. The communication with the third circuit can also include receiving, by the first circuit, from the third circuit, a fifth signal having a second voltage level to indicate a fourth amount of power transmitted by the second transmitter. The communication with the third circuit can also include controlling, by the first circuit, the second transmitter to adjust the fourth signal from the fourth amount of power to a fifth amount of power.

In some embodiments, the transmitter can transmit the first signal at a first point in time. The second transmitter can transmit the fourth signal at a second point in time, and the first point in time and the second point in time can be different.

At least one embodiment relates to a device. The device can include a first circuit. The first circuit can receive, from an amplifier, a first signal having a first amount of power. The first circuit can also determine, based on the first amount of power, a range of power associated with transmission of the first signal by a transmitter. The device can also include a second circuit. The second circuit can receive, from the first circuit, a second signal to define one or more characteristics of the second circuit. Receipt of the second signal, by the second circuit, can cause the second circuit to adjust the first signal from the first amount of power to a second amount of power. The device can also include a third circuit. The third circuit can receive, from the second circuit, the first signal having the second amount of power. The third circuit can also provide a third signal having a voltage level to indicate a third amount of power transmitted by the transmitter.

In some embodiments, the third amount of power can be the same as the first amount of power. The third signal can be provided to the first circuit. The first circuit can receive, from the third circuit, the third signal. The first circuit can also determine, responsive to receipt of the third signal, that the third signal has a second voltage level to indicate a fourth amount of power transmitted by the transmitter. The first circuit can also retrieve, from memory of the device, a table that includes correlations between a plurality of voltage levels of the third signal and a plurality of amounts of power that the transmitter is configured to transmit. The first circuit can also determine, based on the table, that the voltage level is correlated to the third amount of power. The first circuit can also control, responsive to the third signal having the second voltage level, the transmitter to cause the transmitter to adjust the first signal from the fourth amount of power to the first amount of power.

In some embodiments, the transmitter can transmit the first signal responsive to receipt of the first signal by the first circuit. The second amount of power can be different than the first amount of power, and the second circuit can adjust a plurality of signals by a predetermined amount.

In some embodiments, the first circuit can also receive, from the amplifier, a fourth signal having a fourth amount of power. The first circuit can also determine, based on the fourth amount of power, a second power range associated with transmission of the fourth signal by a second transmitter. The first circuit can also control the second circuit to adjust the fourth signal from the fourth amount of power to a fifth amount of power.

In some embodiments, the first circuit can also receive, at a first point in time, the third signal. The first circuit can also receive, at a second point in time, a fifth signal having a second voltage level to indicate a sixth amount of power transmitted by the second transmitter. The first point in time can be different than the second point in time.

In some embodiments, the first circuit can also retrieve, responsive to receipt of the third signal, a first table stored in memory of the device. The first circuit can also determine, based on the first table, that the third amount of power is the same as the first amount of power. The first circuit can also retrieve, responsive to receipt of the fifth signal, a second table stored in memory of the device. The first circuit can also determine, based on the second table, that the sixth amount of power is the same as the fourth amount of power.

In some embodiments, the transmitter can transmit the first signal according to a first protocol. A second transmitter can transmit a fourth signal according to a second protocol. The first circuit can control transmission of the first signal by the transmitter and control transmission of the fourth signal by the second transmitter based on communication with the third circuit.

In some embodiments, the transmitter can transmit the first signal at a first point in time. The second transmitter can transmit the fourth signal at a second point in time, and the first point in time and the second point in time can be different.

At least one embodiment relates to a method. The method can include receiving, by a first circuit of a device, from an amplifier, a first signal having a first amount of power. The method can also include determining, by the first circuit of the device, based on the first amount of power, a range of power associated with transmission of the first signal by the transmitter. The method can also include receiving, by a second circuit of the device, from the first circuit of the device, a second signal to define one or more characteristics of the second circuit of the device. Receipt of the second signal, by the second circuit of the device, can cause the second circuit of the device to adjust the first signal from the first amount of power to a second amount of power. The method can also include receiving, by a third circuit of the device, from the second circuit of the device, the first signal having the second amount of power. The method can also include providing, by the third circuit of the device, a third signal having a voltage level to indicate a third amount of power transmitted by the transmitter.

In some embodiments, the third amount of power can be the same as the first amount of power. The third signal can be provided to the first circuit of the device. The method can also include receiving, by the first circuit of the device, from the third circuit of the device, the third signal. The method can also include determining, by the first circuit of the device, responsive to receipt of the third signal, that the third signal has a second voltage level to indicate a fourth amount of power transmitted by the transmitter. The method can also include retrieving, by the first circuit of the device, from memory of the device, a table that includes correlations between a plurality of voltage levels of the third signal and a plurality of amounts of power that the transmitter is configured to transmit. The method can also include determining, by the first circuit of the device, based on the table, that the voltage level is correlated to the third amount of power. The method can also include controlling, by the first circuit of the device, responsive to the third signal having the second voltage level, the transmitter to cause the transmitter to adjust the first signal from the fourth amount of power to the first amount of power.

In some embodiments, the method can also include receiving, by the first circuit of the device, from the amplifier, a fourth signal having a fourth amount of power. The method can also include determining, by the first circuit of the device, based on the fourth amount of power, a second power range associated with transmission of the fourth signal by a second transmitter. The method can also include controlling, by the first circuit of the device, the second circuit of the device to adjust the fourth signal from the fourth amount of power to a fifth amount of power.

FIG. 1 depicts a block diagram of a system 100, according to some embodiments. The system 100 may refer to and/or include at least one of the systems, devices, and/or components described herein. In some embodiments, various systems, devices, and/or components of the system 100 may be added, removed, integrated, separated, rearranged, relocated, and/or replaced. For example, a first component of the system 100 may be relocated from a first device to a second device. As another example, a device that includes one amplifier may be modified to include two amplifiers. In some embodiments, the system 100 may be implemented as and/or housed within a System On Chip (SoC). For example, one or more components of the system 100 may be included in a SoC.

In some embodiments, the system 100 and/or one or more components thereof may be included in and/or implemented as one or more components of a communication device (e.g., an antenna, a transmitter, a transceiver, a receiver, a Radio Frequency (RF) device, etc.). For example, a first component of the system 100 may include a power amplifier and the first component may drive an antenna.

In some embodiments, the system 100 includes at least one device 105, at least one amplifier 145, and at least one transmitter 150. In some embodiments, the device 105 may include the device described herein. In some embodiments, the amplifier 145 may include at least one of the various systems, devices, and/or components described herein. In some embodiments, the transmitter 150 may include the transmitter described herein. The systems, devices, and/or components of the system 100 may be in communication with one another. For example, the amplifier 145 may be communicably coupled with the device 105. As another example, a first component and a second component of the device 105 may be communicably coupled with one another.

The amplifier 145 may be in communication with the device 105. For example, the amplifier 145 may be coupled with the device 105. In some embodiments, the amplifier 145 may be directly coupled with the device 105 (e.g., at least a portion of the amplifier 145 is coupled with at least a portion of the device 105). In some embodiments, the amplifier 145 may be indirectly coupled with the device 105. For example, the amplifier 145 may be directly coupled with a component and the component may also be directly coupled with the device 105. In some embodiments, the amplifier 145 may be electrically coupled with the device 105.

In some embodiments, the amplifier 145 may provide one or more signals. For example, the amplifier 145 may provide a first signal and a second signal. In some embodiments, the amplifier 145 may provide signals via wired communication. For example, the amplifier 145 may be electrically coupled, via a wire and/or cable, with a component. To continue this example, the amplifier 145 may provide, via the wire, one or more signals to the component. In some embodiments, the amplifier 145 may provide signals via wireless communication. For example, the amplifier 145 may include a transceiver and the amplifier 145 may provide, via the transceiver, one or more wireless signals.

In some embodiments, the amplifier 145 may include and/or be implemented as an Opamp. For example, the amplifier 145 may receive a first signal and the amplifier 145 may provide a second signal that is an amplification of the first signal. In some embodiments, the amplifier 145 may provide a signal to indicate an amount of power. For example, the amplifier 145 may provide a signal having a voltage level of 5V and the voltage level of 5V may indicate an amount of power. As another example, the amplifier 145 may provide an amplified signal and the amplified signal (based on a gain factor of the amplifier 145) may indicate an amount of power.

In some embodiments, the amplifier 145 may provide one or more signals to the device 105. For example, the amplifier 145 may provide a first signal and a second signal to the device 105. In some embodiments, the amplifier 145 may provide signals having one or more levels. For example, the amplifier 145 may provide a first signal having a first level and a second signal having a second level. In some embodiments, the levels may indicate an amount of power. For example, a signal having a first level may indicate a first amount of power. In some embodiments, the levels of the signals, provided by the amplifier 145, may have one or more values. For example, a first level of a first signal may include a first value and/or a second value. As another example, a first signal may include a first level and a second signal may include a second level. To continue this example, the first level and the second level may be similar to one another (e.g., the same level) and/or different from one another (e.g., the first level is larger than and/or smaller than the second level).

In some embodiments, the levels and/or values of the signals provided by the amplifier 145 may pertain to one or more modes of the system 100 and/or the device 105. For example, the amplifier 145 may provide a first signal, in response to a selection (via an input device) of a first mode. In some embodiments, the one or more modes may refer to and/or include one or more protocols. For example, a first mode may pertain to communications via Bluetooth (e.g., a protocol). As another example, a second mode may pertain to communications via WLAN (e.g., a protocol).

In some embodiments, the amplifier 145 may provide a first signal having a first value to indicate a first mode. For example, the amplifier 145 may provide a signal having a value to indicate communication via Bluetooth. In some embodiments, the amplifier 145 may provide one or more signals having one or more values to indicate one or more modes. For example, the amplifier 145 may provide a second signal having a second value to indicate a second mode.

In some embodiments, the transmitter 150 may include at least one of communication devices, transceivers, receivers, antennas, radio frequency devices, telecommunication devices, and/or various combinations. The transmitter 150 may transmit and/or provide signals that correspond to one or more protocols. For example, the transmitter 150 may transmit signals that correspond to WLAN communication. As another example, the transmitter 150 may transmit signals that correspond to Bluetooth communication. In some embodiments, the system 100 may include a first transmitter 150 and a second transmitter 150. The first transmitter 150 may transmit signals that correspond to a first protocol. The second transmitter 150 may transmit signals that correspond to a second protocol. In some embodiments, the transmitter 150 may transmit signals that correspond to a first mode and/or a second mode.

In some embodiments, the device 105 may include at least one processing circuit 110, at least one power detector 130, at least one attenuator 135, and at least one baseband 140. In some embodiments, the processing circuit 110 may refer to and/or include at least one of the circuits and/or circuitry described herein. In some embodiments, the processing circuit 110 may include at least one processor 115 and memory 120. Memory 120 may refer to and/or include one or more devices (e.g., Random Access Memory (RAM), Read Only Memory (ROM), Flash memory, hard disk storage) for storing data and/or computer code for completing and/or facilitating the various processes described herein. Memory 120 may be and/or include non-transient volatile memory, non-volatile memory, and non-transitory computer storage media. Memory 120 may include database components, object code components, script components, or any other type of information structure for supporting the various activities and information structures described herein. Memory 120 may be communicably coupled to the processors 115 and memory 120 may include computer code or instructions (e.g., firmware or software) for executing one or more processes described herein.

The processors 115 may be implemented as one or more application specific integrated circuits (ASICs), field programmable gate arrays (FPGAs), a group of processing components, or other suitable electronic processing components. Memory 120 may store one or more instructions that, when executed by the processors 115, cause the processors 115 to perform one or more of the various operations or processes described herein. In some embodiments, memory 120 may store, keep, and/or maintain at least one of records, tables, databases, data structures, and/or collections of information.

In some embodiments, memory 120 may store, keep, and/or maintain at least one table 125. The table 125 may refer to and/or include the table described herein. In some embodiments, the table 125 may include one or more graphs. For example, the table 125 may include a graph that includes one or more regions. The regions may include, indicate, and/or represent correlations between one or more voltage levels and transmitted power levels. For example, a first region may correlate voltage levels with power levels associated with transmissions by the transmitter 150.

In some embodiments, the processing circuit 110 and/or one or more components thereof may perform functionality similar to that of at least one of the power detector 130, the attenuator 135, and/or the baseband 140. For example, memory 120 may store instructions that, when executed by the processors 115, cause the processors 115 to perform similar functionality to that of the power detector 130. In some embodiments, one or more components of the device 105 may be communicably coupled with one another. For example, the power detector 130 may be communicably coupled with the attenuator 135.

In some embodiments, the power detector 130 may receive one or more signals. For example, the power detector 130 may receive one or more signals from the amplifier 145. In some embodiments, the power detector 130 may receive signals having one or more power levels. For example, the power detector 130 may receive a first signal having a first amount of power and the power detector 130 may receive a second signal having a second amount of power. In some embodiments, the power detector 130 may detect one or more power levels. For example, the power detector 130 may detect that a first signal has a first amount of power. In some embodiments, the power detector 130 may detect one or more power levels by at least one of determining a voltage level, determining a current level, and/or various combinations.

In some embodiments, the power detector 130 may determine one or more ranges of power. For example, the power detector 130 may determine ranges of power for the transmitter 150. Stated otherwise, the power detector 130 may determine given amounts of power, given decibels levels, and/or signal strengths that may be transmitted by the transmitter 150.

As a non-limiting example, the transmitter 150 may correspond to and/or transmit signals that correspond to WLAN communication. To continue this non-limiting example, transmission of signals that correspond to WLAN communication may include a given power range. In this non-limiting example, the power detector 130 may receive from the amplifier 145, a first signal that includes a first amount of power. The first amount of power may correspond to WLAN communication. To continue this non-limiting example, the power detector 130 may determine, based on the first amount of power, a power range for the transmitter 150. In this non-limiting example, the power detector 130 may determine the power range for WLAN communication.

In some embodiments, the power detector 130 may provide and/or transmit one or more signals. For example, the power detector 130 may provide one or more signals to the attenuator 135. In some embodiments, the power detector 130 may provide signals to control the attenuator 135. For example, the attenuator 135 may be able to attenuate signals at one or more rates and/or percentages. To continue this example, the power detector 130 may provide signals, to the attenuator 135, to control a given attenuation rate for the attenuator 135.

In some embodiments, the attenuator 135 may receive one or more signals. For example, the attenuator 135 may receive signals from the power detector 130. In some embodiments, the attenuator 135 may receive signals that define one or more characteristics of the attenuator 135. For example, the attenuator 135 may include one or more capacitors and one or more switches. To continue this example, the opening and/or closing (e.g., characteristics) of the switches may control and/or adjust an attenuation rate of the attenuator 135. In some embodiments, the attenuator 135 receiving signals, from the power detector 130, may cause the attenuator 135 to adjust one or more amounts of power. For example, the attenuator 135 may receive from the amplifier 145, one or more signals and the attenuator 135 may adjust the one or more signals from a first amount of power to a second amount of power.

In some embodiments, the attenuator 135 may provide one or more signals. For example, the attenuator 135 may provide signals to the baseband 140. In some embodiments, the attenuator 135 may provide attenuated amplifier signals (e.g., adjusted signals that were provided by the amplifier 145). For example, the attenuator 135 may receive a first signal having a first amount of power and the attenuator 135 may adjust the first signal to a second amount of power. To continue this example, the attenuator 135 may provide, to the baseband 140, the first signal and the first signal may have the second amount of power.

The baseband 140 may receive one or more signals. For example, the baseband 140 may receive one or more signals from the attenuator 135. In some embodiments, the baseband 140 may receive one or more modified and/or adjusted signals. For example, the baseband 140 may receive one or more first signals that correspond to one or more second signals transmitted by the transmitter 150. To continue this example, the one or more first signals may have been adjusted by the attenuator 135.

In some embodiments, the baseband 140 may determine one or more signal levels. For example, the baseband 140 may determine one or more levels for the signals provided by the attenuator 135. As another example, the baseband 140 may determine one or more levels for signals that are transmitted by the transmitter 150. In some embodiments, the signal levels may refer to and/or include at least one of voltage levels, current levels, and/or power levels. In some embodiments, the signals provided by the amplifier 145 may include one or more levels that exceed a predetermined level for the baseband 140. For example, the baseband 140 may be rated to receive voltage levels of a given value and the voltage levels of signals provided by the amplifier 145 may exceed the given value. In some embodiments, the attenuator 135 may attenuate one or more signals to adjust the signals from voltage levels that exceed the predetermined level to voltage levels within the predetermined level.

In some embodiments, the baseband 140 may provide one or more Transmitted Signal Strength Indicator (TSSI) signals. In some embodiments, the TSSI signals may include one or more voltage levels and the voltage levels may indicate and/or correspond to amounts of power transmitted by the transmitter 150. For example, a first TSSI signal may have a first voltage level and the first voltage level may indicate that the transmitter 150 transmitted a signal having a first amount of power. As another example, voltage levels for the TSSI signals may correspond to one or more decibel levels. For example, the table 125 may include correlations between a first TSSI voltage level and one or more amounts of power. In some embodiments, the baseband 140 may provide the TSSI signals to one or more components of the system 100. For example, the baseband 140 may provide the TSSI signals to the power detector 130.

In some embodiments, the power detector 130 may receive signals that correspond to one or more transmitters. For example, the power detector 130 may receive a first signal that corresponds to signals transmitted by a first transmitter 150. To continue this example, the power detector 130 may receive a second signal that corresponds to signals transmitted by a second transmitter 150. In some embodiments, the power detector 130 may identify one or more transmitters based on the signals provided by the amplifier 145. For example, a first transmitter 150 may transmit signals having a first power range. To continue this example, the power detector 130 may identify the first transmitter 150 responsive to the power detector 130 receiving from the amplifier 145, a first signal having an amount of power that corresponds to the first power range.

In some embodiments, the power detector 130 may control the attenuator 135 based on the transmitter 150 and/or the signals provided by the amplifier 145. For example, the power detector 130 may control the attenuator 135 based on the power detector 130 receiving from the amplifier 145, a signal that corresponds to a first communication protocol. To continue this example, the power detector 130 may control the attenuator 135 to adjust the signal by a first amount based on the signal corresponding to the first communication protocol.

Figure 2:
FIG. 2 is a graph including relationships between one or more amounts of power and one or more Transmitted Signal Strength Indicator (TSSI) levels, according to some embodiments.
Figure 2:
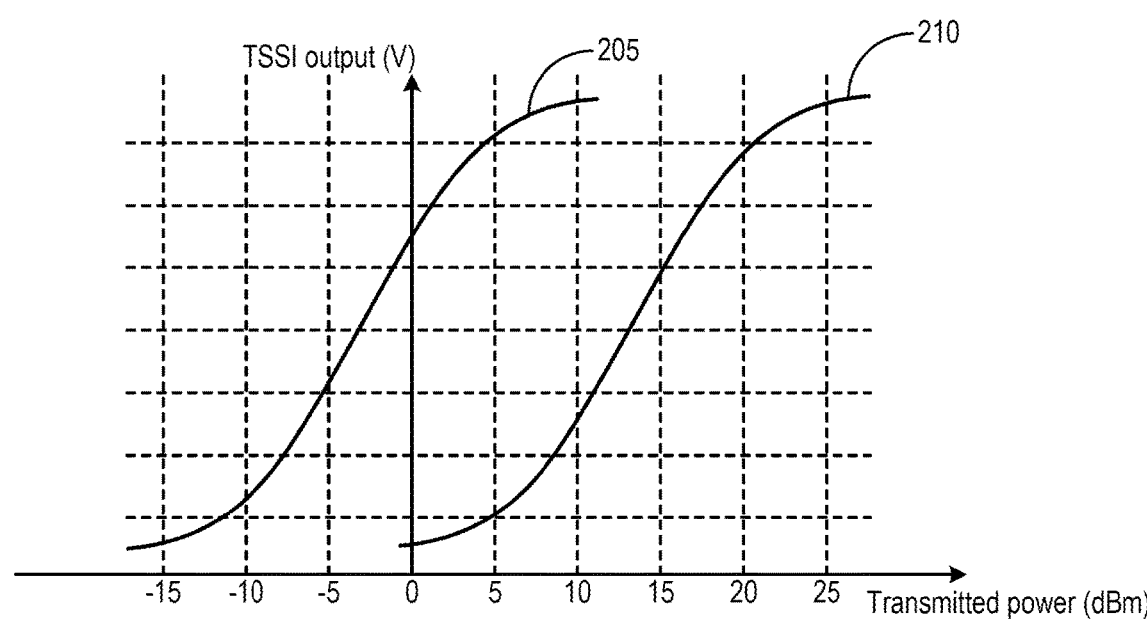

FIG. 2 depicts a graph 200, according to some embodiments. In some embodiments, the graph 200 may include at least one of the various tables, graphs, and/or data structures described herein. In some embodiments, the graph 200 may be stored in and/or located in the table 125. In some embodiments, the graph 200 may include and/or illustrate the various correlations described herein. The graph 200 may include regions 205 and 210. In some embodiments, the region 205 may include a first region and the region 210 may include a second region. The regions (e.g., regions 205 and 210) may correspond to and/or represent correlations between TSSI voltage levels and transmitted power levels. As shown in FIG. 2, the TSSI voltage levels may be associated with one or more transmitted power levels. For example, a TSSI voltage level of around 7 Volts is shown to correspond to 5 dBm and 15 dBm. To continue this example, the device 105 may distinguish TSSI signals by choosing a given range to use during signal analysis.

In some embodiments, the regions (e.g., regions 205 and 210) may correspond to various attenuation rates for the attenuator 135. For example, a first region may correspond to a first attenuation rate for the attenuator 135. In some embodiments, the power detector 130 may determine a first amount of power associated with a transmission of the transmitter 150. To continue this example, the power detector 130 may select a given region of the table 125 that includes power levels associated with the first amount of power.

In some embodiments, the graph 200 and/or the correlations illustrated by the graph 200 may provide some of the technical solutions described herein. For example, the regions of the graph 200 may provide a dynamic range of a given communication standard to be distributed and/or separated such that various power levels of the dynamic range may be represented by a single TSSI signal level. For example, FIG. 2 illustrates an example that a TSSI signal level of 3 volts may represent a transmitted power level of −5 dB and 12 dB.

In some embodiments, the graph 200 may be used during feedback loop and/or closed loop control. For example, the power detector 130 may determine a given range of the graph 200 to use why monitoring signal transmissions of the transmitter 150.

Figure 3:
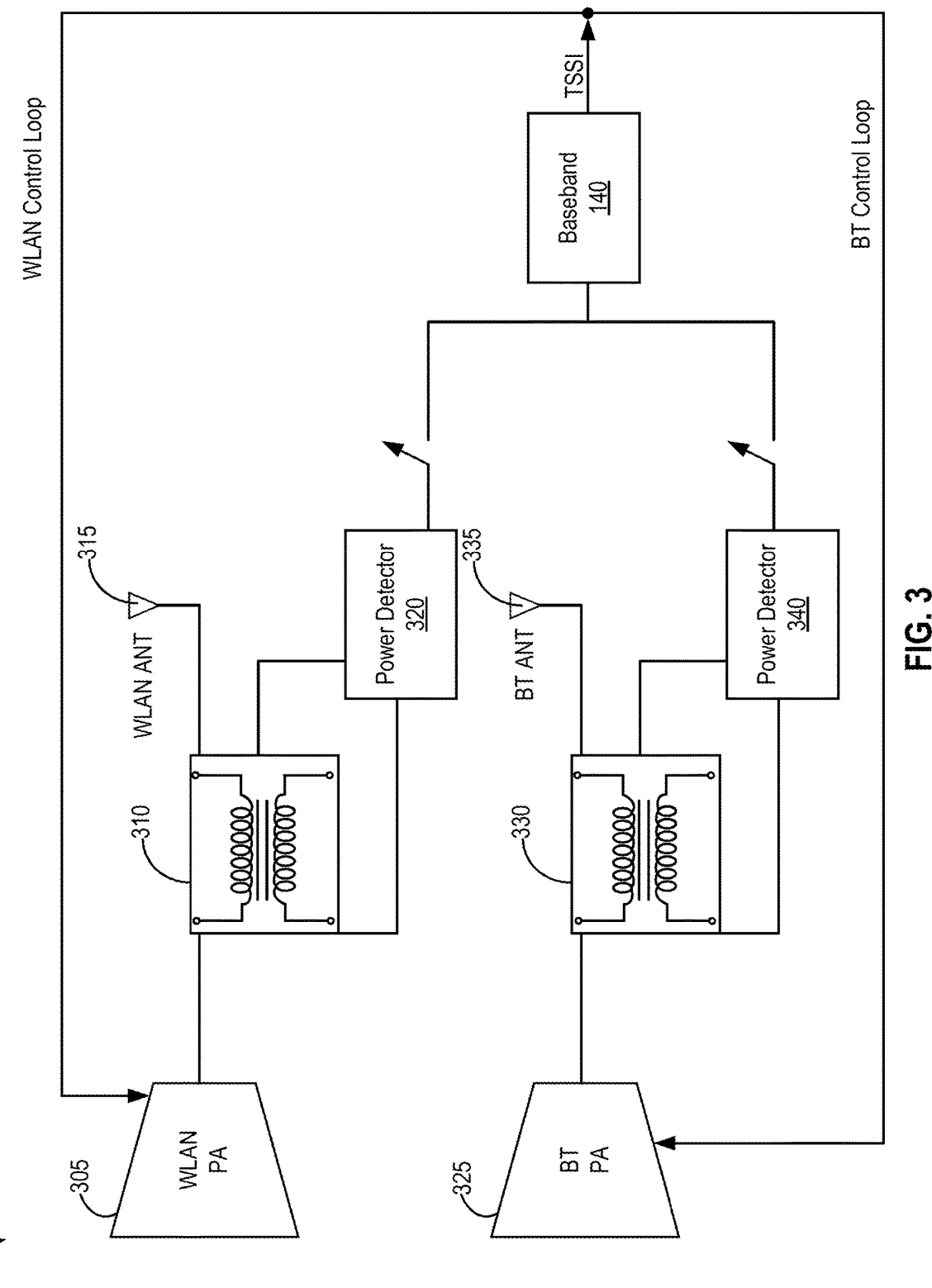
FIG. 3 is a schematic block diagram including one or more devices of the system illustrated in FIG. 1, according to some embodiments.

FIG. 3 depicts a schematic block diagram 300, according to some embodiments. In some embodiments, the schematic block diagram 300 may include at least one of the systems, devices, and/or components of the system 100. For example, the schematic block diagram 300 can include the power detector 130. In some embodiments, the various systems, devices, and/or components of the schematic block diagram 300 may be added, removed, integrated, separated, rearranged, relocated, and/or replaced. For example, while the schematic block diagram 300 may be shown having two or more similar components, the schematic block diagram 300 may be modified such that at least one of the components is removed. As another example, a device that is shown to include a single component may be modified to also have a second component.

In some embodiments, the schematic block diagram 300 may include at least one WLAN power amplifier 305, at least one attenuator 310, at least one WLAN antenna 315, at least one power detector 320, at least one Bluetooth power amplifier 325, at least one attenuator 330, at least one Bluetooth antenna 335, at least one power detector 340, and the baseband 140. In some embodiments, at least one of system, device, and/or component of the schematic block diagram 300 may include and/or perform similar functionality to at least one system, device, and/or component described herein.

In some embodiments, the WLAN power amplifier 305 and/or WLAN PA 305 may provide a first signal to the power detector 320. For example, the WLAN PA 305 may provide a signal to indicate transmissions associated with the WLAN antenna 315 and/or WLAN ANT 315. To continue this example, the signal may include a first amount of power. In some embodiments, the power detector 320 may control, based on the signal received from the WLAN PA 305, the attenuator 310. For example, the power detector 320 may transmit to the attenuator 310, one or more signals to adjust an attenuation rate for the attenuator 310. In some embodiments, the power detector 320 may select a given region of the graph 200 for use in feedback control of transmissions by the WLAN ANT 315. For example, the power detector 320 may select region 210.

In some embodiments, the attenuator 310 may receive, from the WLAN PA 305, a first signal and the attenuator 310 may attenuate the first signal. For example, the attenuator 310 may adjust the first signal from a first amount of power to a second amount of power. In some embodiments, the attenuator 310 may provide the attenuated signal to the baseband 140. For example, the attenuator 310 may be electrically coupled with the baseband 140.

In some embodiments, the baseband 140 may receive the attenuated signal from the attenuator 310. The baseband 140 can generate, based on the attenuated signal, one or more TSSI signals. For example, the baseband 140 can determine a given amount of power for the attenuated signal and the baseband 140 can generate a corresponding TSSI signal. In some embodiments, the baseband 140 can provide the TSSI signals to the power detector 320. As shown in FIG. 3, the baseband 140 may provide the TSSI in conjunction with and/or as a port of a WLAN Control Loop. In some embodiments, the WLAN Control Loop may include the power detector 320 determining a power range for the WLAN ANT 315 and the power detector 320 selecting a given region of the graph 200. The WLAN control Loop may also include the power detector 320 controlling an attenuation rate for the attenuator 310 and the attenuator 310 providing an attenuated signal to the baseband 140. The WLAN Control Loop may also include the baseband 140 transmitting TSSI signals to the power detector 320 and the power detector 320 controlling transmissions of the WLAN ANT 315 based on the TSSI signals.

In some embodiments, the TSSI signals may have one or more voltage levels to indicate one or more amounts of power. For example, a first TSSI signal may have a first voltage level to indicate a first amount of power. As another example, the first TSSI signal may have a first voltage level to indicate a first amount of power and a second amount of power. To continue this example, the power detector 320 may use the graph 200 to determine which amount of power that the first TSSI signal corresponds to.

In some embodiments, the power detector 320 may receive the TSSI signals. For example, the power detector 130 may receive TSSI signals that corresponds to transmissions of the WLAN ANT 315. In some embodiments, the power detector 320 may determine a signal strength of a transmitted signal based on the TSSI signals. For example, the power detector 320 may retrieve from memory 120, the table 125. To continue this example, the power detector 320 may determine, based on the table 125, a given transmitted power level that is associated with the TSSI signal. Stated otherwise, the power detector 320 may use the selected region as well as correlations between TSSI signals and power levels for the selected region to determine a transmitted power level.

In some embodiments, the power detector 320 may determine, based on the TSSI signals, that a given TSSI signal indicates a difference between a signal provided by the WLAN PA 305 and a signal transmitted by the WLAN ANT 315. For example, the WLAN PA 305 may provide a signal to indicate that the WLAN ANT 315 transmit a second signal having a given power level. To continue this example, the given power level may be associated with a given TSSI voltage level. The power detector 320 may determine a difference between the signal provided by the WLAN PA 305 and the signal transmitted by the WLAN ANT 315 responsive to the power detector 320 determining that the TSSI voltage level is associated with an amount of power that is different that the amount of power indicated by the signal provided by the WLAN PA 305.

As a non-limiting example, the power detector 320 may receive, from the WLAN PA 305, a first signal to indicate a power level of 20 dB. In this non-limiting example, the power detector 320 may determine, based on the first signal provided by the WLAN PA 305, that the first signal corresponds to transmissions by the WLAN ANT 315. To continue this non-limiting example, the power detector 320 may determine a given region of the graph 200. In this non-limiting example, the power detector 320 may determine the region 210. To continue this example, the power detector 320 may determine, based on the region 210, a given setpoint for the attenuator 310. In this non-limiting example, the attenuator 310 may attenuate, based on the given setpoint, the first signal. To continue this non-limiting example, the attenuator 310 may provide the attenuated signal to the baseband 140. In this non-limiting example, the baseband 140 may determine, based on the attenuated signal, a given TSSI voltage level. To continue this non-limiting example, the baseband 140 may provide a TSSI signal having the given TSSI voltage level to the power detector 320. In this non-limiting example, the TSSI voltage level may be 7 Volts. To continue this example, the power detector 320 may determine, based on the TSSI voltage level, that the transmitted power level associated with transmissions of the WLAN ANT 315 is 20 dB.

As another non-limiting example, the power detector 320 may receive a second TSSI signal having a voltage level of 5 Volts. In this non-limiting example, the power detector 320 may determine that the voltage level of 5 Volts corresponds to a transmitted power level of 15 dB. To continue this example, the power detector 320 may perform feedback control to modify and/or adjust transmissions of the WLAN ANT 315 responsive to the power detector 320 determining that the transmitted power level of 15 dB is different that a power level indicated by a given signal of the WLAN PA 305.

In some embodiments, the Bluetooth power amplifier 325 and/or BT PA 325 may provide, to the power detector 340, a signal to indicate transmissions associated with the Bluetooth antenna 335 and/or BT ANT 335. In some embodiments, the power detector 340, the attenuator 330, and the baseband 140 may provide one or more similar steps or processes described herein to perform a BT Control Loop. For example, the power detector 340 may control an attenuation rate of the attenuator 330 and the power detector 340 may determine a given region of the graph 200 for use in feedback control of transmissions by the BT ANT 335.

Figure 4:
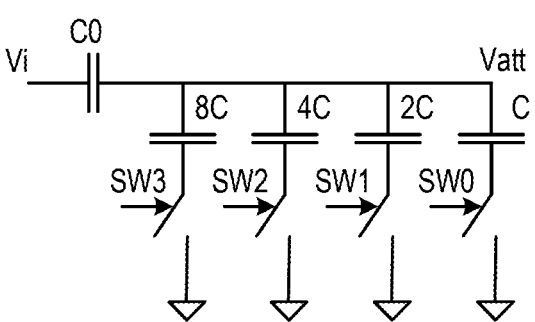
FIG. 4 is a schematic block diagram of an attenuator included in the system illustrated in FIG. 1, according to some embodiments.

FIG. 4 depicts a schematic block diagram of the attenuator 135, according to some embodiments. The attenuator 135, as shown in FIG. 4 may include at least one capacitor and at least one switch. In some embodiments, the switches may be controllable by the power detector 130. For example, the power detector 130 may provide, to the attenuator 135, a first signal to cause a first switch to open and to cause a second switch to close. In some embodiments, given switches may be opened and/or closed based on a given region of the graph 200. For example, a first switch and a second switch may be opened when the power detector 130 is using region 205. As another example, a third switch may be opened when the power detector 130 is using region 210.

Figure 5:
FIG. 5 is a block diagram of a process for providing signal transmission control and power feedback loops, according to some embodiments.
Figure 5:
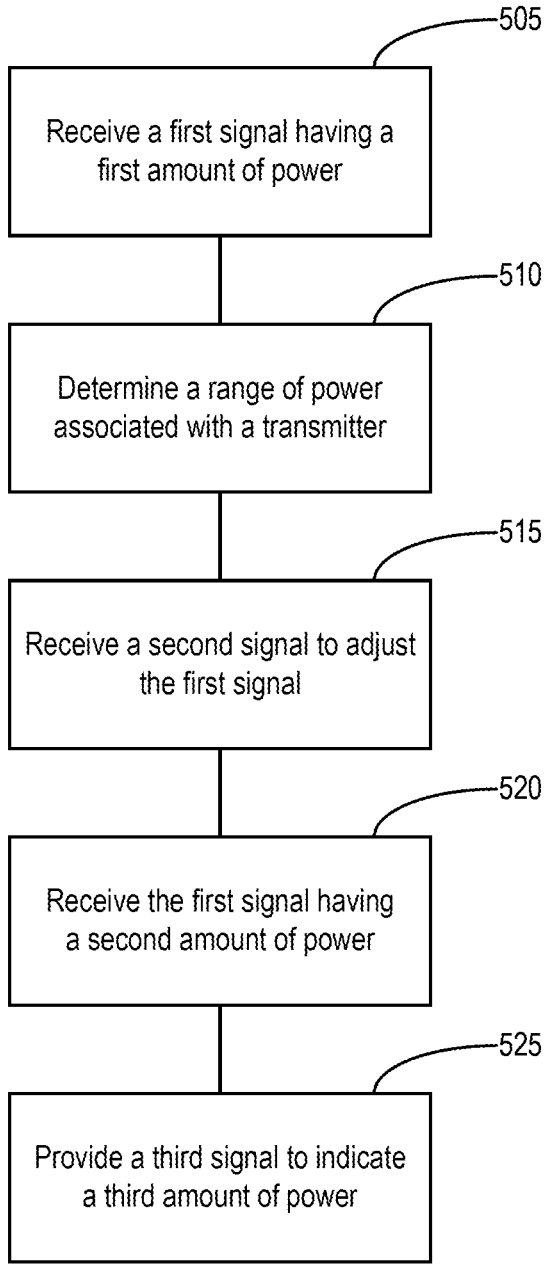

FIG. 5 depicts a block diagram of a process 500, according to some embodiments. In some embodiments, at least one of the various systems, devices, and/or components described herein may perform at least one step of the process 500. For example, the processing circuit 110 may perform at least one step of the process 500. While some of the steps of the process 500 are described as being performed by one or more given systems, devices, and/or components, the one or more steps of the process 500 are not limited to being performed in accordance with the examples described herein.

In step 505, a first signal having a first amount of power can be received. For example, the power detector 130 may receive a first signal. In some embodiments, the power detector 130 may receive the first signal from the amplifier 145. The power detector 130 may receive the first signal responsive to a user interaction with a display device. For example, the power detector 130 may receive the first signal responsive to a user interacting with a touch screen of a mobile device.

In some embodiments, the first signal may correspond to at least one protocol. For example, the first signal may correspond to WLAN transmissions. As another example, the first signal may correspond to Bluetooth transmissions. In some embodiments, the first signal may be provided to the transmitter 150 for transmission. For example, the transmitter 150 may transmit the first signal responsive to receipt, in step 505, of the first signal.

In step 510, a range of power associated with a transmitter may be determined. For example, a range of power associated with the transmitter 150 may be determined. In some embodiments, the power detector 130 may determine the range of power for the transmitter 150 based on the amount of power of the first signal. For example, the first signal may include an amount of power of 25 dB and the power detector 130 may determine a range of power for the transmitter 150 based on 25 dB. Stated otherwise, the power detector 130 may determine a range of power that is associated with the transmitter 150 transmitting a signal having 25 dB.

In some embodiments, the range of power may refer to and/or include a signal variance. For example, the range of power may include one or more amounts of power that are greater than and/or less than the amount of power of the first signal. In some embodiments, the power detector 130 may determine, based on the range power a given region of the graph 200. For example, the power detector 130 may determine the region 210.

In step 515, a second signal to adjust the first signal may be received. For example, the attenuator 135 may receive a signal that causes an attenuation rate of the attenuator 135 to change. In some embodiments, the power detector 130 may provide the second signal to the attenuator 135. For example, the power detector 130 may provide the second signal responsive to the power detector 130 determining a given region of the graph 200.

In some embodiments, the second signal may cause the attenuator 135 to adjust one or more signals. For example, the second signal may cause one or more switches of the attenuator 135 to open and/or close and the given opening and/or closing of the one or more switches may dictate and/or determine an attenuation rate for the attenuator 135. In some embodiments, the attenuator 135 may receive the first signal and the attenuator 135 may adjust, responsive to receipt of the second signal, the first signal from a first amount of power to a second amount of power.

In step 520, the first signal having a second amount of power may be received. For example, the baseband 140 may receive the first signal having the second amount of power. In some embodiments, the baseband 140 may receive the first signal responsive to the attenuator 135 adjusting the first signal from the first amount of power to the second amount of power. In some embodiments, the first signal may be adjusted to a given second amount of power based on a predetermined threshold for power levels. For example, the first signal may be adjusted based on a voltage rating of the baseband 140.

In step 525 a third signal to indicate a third amount of power may be provided. For example, the baseband 140 may provide the third signal to the power detector 130. In some embodiments, the third signal may refer to and/or include at least one of the various TSSI signals described herein. For example, the third signal may include a voltage level to indicate a given transmitted power level. In some embodiments, the baseband 140 may provide the third signal to the power detector 130 and the power detector 130 may perform, based on the voltage level of the third signal, feedback control.

In some embodiments, the power detector 130 may perform at least one of the various feedback loops, feedback control, and/or transmitter control described herein. For example, the voltage level of the third signal may be correlated, based on the graph 200, with a given transmitted power level. To continue this example, the power detector 130 may control and/or adjust transmissions of the transmitter 150 responsive to the power detector 130 detecting a difference between the first amount of power of the first signal and an amount of power that corresponds to the voltage level of the third signal.

The hardware systems described herein may be implemented in many different ways and in many different combinations of hardware and software and circuit designs. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLO), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples. In some embodiments, the circuitry can be provided on one or more integrated circuit dies in an integrated circuit package. The integrated circuit package can be a combination of two or more packages in some embodiments.

The circuitry may further include or access instructions (e.g., software or firmware) for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HOD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

The term "coupled" and variations thereof includes the joining of two members directly or indirectly to one another. The term "electrically coupled" and variations thereof includes the joining of two members directly or indirectly to one another through conductive materials (e.g., metal or copper traces). Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities that can operate within a system or environment. It should be understood that the systems described above can provide multiple ones of any or each of those components and these components can be provided on either a stand-alone machine or, in some embodiments, on multiple machines in a distributed system. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system, comprising:
a transmitter; and
a device in communication with the transmitter, and the device comprising:
a first circuit configured to:
receive, from an amplifier, a first signal having a first amount of power; and
determine, based on the first amount of power, a range of power associated with transmission of the first signal by the transmitter;
a second circuit configured to:
receive, from the first circuit, a second signal to define one or more characteristics of the second circuit, wherein receipt of the second signal, by the second circuit, causes the second circuit to adjust the first signal from the first amount of power to a second amount of power; and a third circuit configured to:
receive, from the second circuit, the first signal having the second amount of power; and
provide a third signal having a voltage level to indicate a third amount of power transmitted by the transmitter.

2. The system of claim 1, wherein the third amount of power is the same as the first amount of power, wherein the third signal is provided to the first circuit, and further comprising:
the first circuit configured to:
receive, from the third circuit, the third signal;
determine, responsive to receipt of the third signal, that the third signal has a second voltage level to indicate a fourth amount of power transmitted by the transmitter;
retrieve, from memory of the device, a table that includes correlations between a plurality of voltage levels of the third signal and a plurality of amounts of power that the transmitter is configured to transmit;
determine, based on the table, that the voltage level is correlated to the third amount of power; and
control, responsive to the third signal having the second voltage level, the transmitter to cause the transmitter to adjust the first signal from the fourth amount of power to the first amount of power.

3. The system of claim 2, wherein:
the transmitter transmits the first signal responsive to receipt of the first signal by the first circuit;
the second amount of power is different than the first amount of power; and
the second circuit is configured to adjust a plurality of signals by a predetermined amount.

4. The system of claim 1, further comprising:
the first circuit configured to:
receive, from the amplifier, a fourth signal having a fourth amount of power;
determine, based on the fourth amount of power, a second power range associated with transmission of the fourth signal by a second transmitter; and
control the second circuit to adjust the fourth signal from the fourth amount of power to a fifth amount of power.

5. The system of claim 4, further comprising:
the first circuit configured to:
receive, at a first point in time, the third signal; and
receive, at a second point in time, a fifth signal having a second voltage level to indicate a sixth amount of power transmitted by the second transmitter;
wherein the first point in time is different than the second point in time.

6. The system of claim 5, further comprising:
the first circuit configured to:
retrieve, responsive to receipt of the third signal, a first table stored in memory of the device;
determine, based on the first table, that the third amount of power is the same as the first amount of power;
retrieve, responsive to receipt of the fifth signal, a second table stored in memory of the device; and
determine, based on the second table, that the sixth amount of power is the same as the fourth amount of power.

7. The system of claim 1, further comprising:
the transmitter configured to transmit the first signal according to a first protocol;

a second transmitter configured to transmit a fourth signal according to a second protocol; and the first circuit configured to control transmission of the first signal by the transmitter and control transmission of the fourth signal by the second transmitter based on communication with the third circuit.

8. The system of claim 7, wherein the communication with the third circuit includes:

determining, by the first circuit, that the third amount of power is different from the first amount of power;

controlling, by the first circuit, based on the difference between the third amount of power and the first amount of power, the transmitter to adjust transmission of the first signal by the transmitter;

receiving, by the first circuit, from the third circuit, a fifth signal having a second voltage level to indicate a fourth amount of power transmitted by the second transmitter; and controlling, by the first circuit, the second transmitter to adjust the fourth signal from the fourth amount of power to a fifth amount of power.

9. The system of claim 7, wherein the transmitter is configured to transmit the first signal at a first point in time, wherein the second transmitter is configured to transmit the fourth signal at a second point in time, and wherein the first point in time and the second point in time are different.

10. A device, comprising:

a first circuit configured to:

receive, from an amplifier, a first signal having a first amount of power; and determine, based on the first amount of power, a range of power associated with transmission of the first signal by a transmitter;

a second circuit configured to:

receive, from the first circuit, a second signal to define one or more characteristics of the second circuit, wherein receipt of the second signal, by the second circuit, causes the second circuit to adjust the first signal from the first amount of power to a second amount of power; and a third circuit configured to:

receive, from the second circuit, the first signal having the second amount of power; and provide a third signal having a voltage level to indicate a third amount of power transmitted by the transmitter.

11. The device of claim 10, wherein the third amount of power is the same as the first amount of power, wherein the third signal is provided to the first circuit, and further comprising:

the first circuit configured to:

receive, from the third circuit, the third signal;

determine, responsive to receipt of the third signal, that the third signal has a second voltage level to indicate a fourth amount of power transmitted by the transmitter;

retrieve, from memory of the device, a table that includes correlations between a plurality of voltage levels of the third signal and a plurality of amounts of power that the transmitter is configured to transmit;

determine, based on the table, that the voltage level is correlated to the third amount of power; and control, responsive to the third signal having the second voltage level, the transmitter to cause the transmitter to adjust the first signal from the fourth amount of power to the first amount of power.

12. The device of claim 11, wherein:

the transmitter transmits the first signal responsive to receipt of the first signal by the first circuit;

the second amount of power is different than the first amount of power; and the second circuit is configured to adjust a plurality of signals by a predetermined amount.

13. The device of claim 10, further comprising:

the first circuit configured to:

receive, from the amplifier, a fourth signal having a fourth amount of power;

determine, based on the fourth amount of power, a second power range associated with transmission of the fourth signal by a second transmitter; and control the second circuit to adjust the fourth signal from the fourth amount of power to a fifth amount of power.

14. The device of claim 13, further comprising:

the first circuit configured to:

receive, at a first point in time, the third signal; and receive, at a second point in time, a fifth signal having a second voltage level to indicate a sixth amount of power transmitted by the second transmitter;

wherein the first point in time is different than the second point in time.

15. The device of claim 14, further comprising:

the first circuit configured to:

retrieve, responsive to receipt of the third signal, a first table stored in memory of the device;

determine, based on the first table, that the third amount of power is the same as the first amount of power;

retrieve, responsive to receipt of the fifth signal, a second table stored in memory of the device; and determine, based on the second table, that the sixth amount of power is the same as the fourth amount of power.

16. The device of claim 10, further comprising:

the transmitter configured to transmit the first signal according to a first protocol;

a second transmitter configured to transmit a fourth signal according to a second protocol; and the first circuit configured to control transmission of the first signal by the transmitter and control transmission of the fourth signal by the second transmitter based on communication with the third circuit.

17. The device of claim 16, wherein the transmitter is configured to transmit the first signal at a first point in time, wherein the second transmitter is configured to transmit the fourth signal at a second point in time, and wherein the first point in time and the second point in time are different.

18. A method, comprising:

receiving, by a first circuit of a device, from an amplifier, a first signal having a first amount of power;

determining, by the first circuit of the device, based on the first amount of power, a range of power associated with transmission of the first signal by the transmitter;

receiving, by a second circuit of the device, from the first circuit of the device, a second signal to define one or more characteristics of the second circuit of the device, wherein receipt of the second signal, by the second circuit of the device, causes the second circuit of the device to adjust the first signal from the first amount of power to a second amount of power;

receiving, by a third circuit of the device, from the second circuit of the device, the first signal having the second amount of power; and providing, by the third circuit of the device, a third signal having a voltage level to indicate a third amount of power transmitted by the transmitter.

19. The method of claim 18, wherein the third amount of power is the same as the first amount of power, wherein the third signal is provided to the first circuit of the device, and further comprising:

receiving, by the first circuit of the device, from the third circuit of the device, the third signal;

determining, by the first circuit of the device, responsive to receipt of the third signal, that the third signal has a second voltage level to indicate a fourth amount of power transmitted by the transmitter;

retrieving, by the first circuit of the device, from memory of the device, a table that includes correlations between a plurality of voltage levels of the third signal and a plurality of amounts of power that the transmitter is configured to transmit;

determining, by the first circuit of the device, based on the table, that the voltage level is correlated to the third amount of power; and controlling, by the first circuit of the device, responsive to the third signal having the second voltage level, the transmitter to cause the transmitter to adjust the first signal from the fourth amount of power to the first amount of power.

20. The method of claim 18, further comprising:

receiving, by the first circuit of the device, from the amplifier, a fourth signal having a fourth amount of power;

determining, by the first circuit of the device, based on the fourth amount of power, a second power range associated with transmission of the fourth signal by a second transmitter; and controlling, by the first circuit of the device, the second circuit of the device to adjust the fourth signal from the fourth amount of power to a fifth amount of power.

\* \* \* \* \*